(12) United States Patent
Lievois et al.

(10) Patent No.: US 11,692,932 B2
(45) Date of Patent: Jul. 4, 2023

(54) METHANE MONITORING AND DETECTION APPARATUS AND METHODS

(71) Applicant: Blue Sky Measurements, Inc., Houston, TX (US)

(72) Inventors: John Lievois, Houston, TX (US); Tanner Lievois, Houston, TX (US)

(*) Notice: Subject to any disclaimer, the term of this patent is extended or adjusted under 35 U.S.C. 154(b) by 0 days.

(21) Appl. No.: 17/767,110

(22) PCT Filed: Dec. 13, 2021

(86) PCT No.: PCT/US2021/072871
§ 371 (c)(1),
(2) Date: Apr. 7, 2022

(87) PCT Pub. No.: WO2022/126137
PCT Pub. Date: Jun. 16, 2022

(65) Prior Publication Data
US 2022/0357273 A1    Nov. 10, 2022

Related U.S. Application Data

(60) Provisional application No. 63/124,739, filed on Dec. 12, 2020.

(51) Int. Cl.
*G01N 21/35* (2014.01)
*G01J 3/02* (2006.01)
(Continued)

(52) U.S. Cl.
CPC ............ *G01N 21/35* (2013.01); *G01J 3/0208* (2013.01); *G01J 3/0229* (2013.01); *G01J 3/28* (2013.01); *G01J 5/0014* (2013.01); *H04N 5/33* (2013.01)

(58) Field of Classification Search
CPC ........... G01N 21/35; G01N 2021/3531; G01N 21/3504; G01J 3/0208; G01J 3/0229;
(Continued)

(56) References Cited

U.S. PATENT DOCUMENTS 4,567,366 A    1/1986   Shinohara
5,644,133 A *  7/1997   Didomenico ........ G01N 21/255
                                              250/236

(Continued)

*Primary Examiner* — Marcus H Taningco
(74) *Attorney, Agent, or Firm* — Matthew J Patterson

(57) ABSTRACT

A low cost, low power, passive optical methane monitoring system for fixed-position installation at oil and gas production well pads and gathering centers is disclosed. The optical methane monitoring system disclosed can be a scannable field of view Near Infrared (NIR) filter photometer to detect and quantify methane concentration in a two dimensional or a three dimensional grid above and around a facility. A randomized fiber optic bundle is disclosed that can be used to direct the total optical power from a collection lens to two or more isolated optical channels. Band pass filters isolate a desired wavelength range for transmission measurements for the two or more channels. Also disclosed is an absorption algorithm which accounts for variable background spectral intensity as well as correcting for water vapor and overall scattering effects to measure methane concentration for a given field of view.

39 Claims, 6 Drawing Sheets

(51) Int. Cl.
*G01J 3/28* (2006.01)
*G01J 5/00* (2022.01)
*H04N 5/33* (2023.01)

(58) Field of Classification Search
CPC ............ G01J 3/28; G01J 5/0014; H04N 5/33; G01M 3/002; G01M 3/38
See application file for complete search history.

(56) References Cited

U.S. PATENT DOCUMENTS

| | | | |
|---|---|---|---|
| 5,680,220 A | 10/1997 | Delignieres et al. | |
| 6,046,814 A * | 4/2000 | Karlsson | G01N 21/255 |
| | | | 250/339.13 |
| 6,061,141 A | 5/2000 | Goldenberg et al. | |
| 6,509,567 B2 | 1/2003 | Boudet et al. | |
| 6,545,278 B1 | 4/2003 | Mottier et al. | |
| 6,756,592 B1 * | 6/2004 | Smith | G01J 3/457 |
| | | | 250/338.5 |
| 7,301,148 B2 | 11/2007 | Johnson | |
| 8,379,208 B1 | 2/2013 | Simmons et al. | |
| 10,375,327 B2 | 8/2019 | Kester | |
| 10,662,765 B2 | 5/2020 | Ferguson et al. | |
| 2011/0038507 A1 | 2/2011 | Hager | |
| 2015/0316415 A1 * | 11/2015 | Islam | A61B 5/7257 |
| | | | 250/338.4 |
| 2016/0097713 A1 | 4/2016 | Kester et al. | |
| 2016/0349228 A1 * | 12/2016 | Kester | G01J 5/0014 |
| 2017/0336281 A1 * | 11/2017 | Waxman | G01N 21/359 |
| 2018/0024104 A1 * | 1/2018 | Islam | G01J 3/453 |
| | | | 250/341.1 |
| 2018/0077363 A1 * | 3/2018 | Kester | G01J 3/36 |
| 2018/0266944 A1 * | 9/2018 | Waxman | G01J 3/42 |
| 2019/0195847 A1 | 6/2019 | Coates | |
| 2020/0088586 A1 | 3/2020 | Kester et al. | |

\* cited by examiner

METHANE MONITORING AND DETECTION APPARATUS AND METHODS

CROSS REFERENCE TO RELATED APPLICATIONS

This application claims the benefit of U.S. Provisional Patent Application Ser. No. 63/124,739 having a filing date of 12 Dec. 2020. The disclosure of the application above is incorporated herein by reference in its entirety.

GOVERNMENT LICENSE RIGHTS

This invention was made with government support under contract number DE-AR0001483 awarded by the Department of Energy. The government has certain rights in the invention.

BACKGROUND OF THE INVENTION

Field of the Invention

This application claims the benefit of U.S. Provisional Patent Application Ser. No. 63/124,739 having a filing date of 12 Dec. 2020 as well as Patent Cooperation Treat Application Serial No. PCT/US2021/72871 filed 13 Dec. 2021. The disclosure of the applications above are incorporated herein by reference in their entirety.

Description of the Related Art

Methane emissions are the second largest source of greenhouse gas emissions after $CO_2$. Estimates vary but methane is believed to be responsible for up to 25% of the global greenhouse gas warming potential. Over a 20 year horizon, methane has more than 80 times the global warming potential of Carbon Dioxide ($CO_2$) on an equivalent mass basis. It should be appreciated by those skilled in the art that it takes a lot less methane to have the same global warming effect as that of $CO_2$.

Human activities are believed to be responsible for over 50% of methane emissions and upstream oil and gas operations are recognized to be a major contributor. Published estimates range from 0.5% to 2.5% of all natural gas production is lost to the atmosphere as fugitive emissions. Upstream oil and gas processing operations are largely responsible due to leaks and venting. Methane is a colorless and odorless gas so without dedicated monitoring equipment, these fugitive emissions can go on undetected. The EPA requires regular monitoring of a wide range of facilities which currently involves an annual or biannual survey. If leaks are detected, the EPA reporting guidance calls for an assumption of an active leak at an estimated rate going back to the day after the last good survey.

Heretofore there exists no low cost, low power, robust fixed-position monitoring system for monitoring an entire wellpad. In the 2014 White House "Climate Action Plan—Strategy to Reduce Methane Emissions", the first goal related to Improving Methane Measurement was "Developing new measurement technologies, including lower-cost emissions sensing equipment". Multiple other organizations from the Environmental Defense Fund to the EPA to the Oil and Gas Climate Initiative, composed primarily of oil and gas producers, have all recognized the need for cost effective methane monitoring technologies.

Most of the prior art technologies are based on an aerial implementation of existing hydrocarbon gas sensing. These include satellite based systems, airplane or helicopter mounted equipment or even drone based systems. The limited options for fixed position monitoring equipment are based on cost prohibitive point sensor networks that sample the air or infrared imaging camera systems. A low cost, low power scanning optical sensor would allow operators to cost effectively monitor their operations for fugitive methane emissions and help them achieve a significant reduction in greenhouse gas emissions.

In view of the foregoing, there is a need for an improved passive detection and monitoring methane monitoring device and methods for surveilling a large area on a semi-continuous basis.

SUMMARY OF THE INVENTION

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a gas monitoring device which may include a focusing optics assembly configured to receive a transmitted light from a passive light source, a light distribution device configured to receive the transmitted light from the focusing optics assembly and further configured to distribute the transmitted light into a plurality of output channels, a plurality of filters corresponding to the plurality of output channels where each of the plurality of filters is configured to receive the transmitted light and to transmit a sensing light of a preselected wavelength range, a plurality of photodetectors corresponding to the plurality of filters and configured to receive the sensing light, and a processor electrically coupled to the plurality of photodetectors and configured to determine an attenuation of the sensing light with respect to the passive light source in the presence of a gas. Other embodiments of this aspect include corresponding computer systems, apparatus, and computer programs recorded on one or more computer storage devices, each configured to perform the actions of the methods.

Implementations may include one or more of the following features. The gas detection system where the preselected wavelength range is in a near infrared spectrum range. The gas includes an amount of methane gas. The processor is further configured to use the attenuation to determine a concentration of methane gas. The gas detection system may include a housing configured to contain any of the focusing optics assembly, the light distribution device, the plurality of filters and the plurality of photodetectors. The gas detection system may include a first positioning device coupled to the housing configured to selectively move the housing in a panning direction and a second positioning device coupled to the housing configured to selectively move the housing in a tilting direction. The gas detection system may include the processor that is further configured to control the first positioning device and the second positioning device to selectively move the housing in the panning direction and the tilting direction to scan an area of interest. The processor is configured to determine the attenuation of the sensing light within the field of view and the path length and where the processor is configured to control the first positioning device and the second positioning device in accordance with the field of view to produce a two dimensional grid may include a plurality of rectangles of the area of interest. The processor is configured to assign the concentration of methane gas to each of the plurality of rectangles. The processor is further configured to produce a two dimensional map of the concentration of methane gas of the area of interest. Each of the plurality of gas monitoring devices is configured to produce a two dimensional grid of the area of interest and where at least one of the processors of the plurality of gas monitoring devices is further configured to use the two dimensional grid from the plurality of gas monitoring devices to produce a three dimensional map of the concentration of methane gas of the area of interest. The gas detection system may include a digital imaging device configured to produce a set of digital images of the area of interest in coordination with the two dimensional grid. The area of interest includes any of a well pad, a pipeline, a storage tank, a refinery, an industrial processing facility and an agricultural facility. The gas detection system may include the housing coupled to a portable mounting device configured to position the gas detection system at a predetermined location. The gas detection system further configured to be permanently positioned in a predetermined location. The passive light source includes light in the near infrared spectrum range. The passive light source may include sunlight. The light distribution device may include a collection end in optical communication with the focusing optics assembly, a fiber bundle may include of a plurality of optical fibers in optical communication with the collection end, and a plurality of sensing legs in optical communication with the plurality of optical fibers, and where the plurality of output channels are may include of the plurality of sensing legs. The light distribution device may include a beam splitter in in optical communication with the focusing optics assembly and configured to split the sensing light into the plurality of output channels. The focusing optics assembly may include a lens. The plurality of filters are band pass filters configured to transmit the sensing light at wavelengths between 1500 nm and 1750 nm. The processor is configured to determine the attenuation of the sensing light within the field of view and the path length. Implementations of the described techniques may include hardware, a method or process, or computer software on a computer-accessible medium.

One general aspect includes a method of detecting gas in the atmosphere. The method of detecting gas also includes receiving a transmitted light from a passive light source through a focusing optics assembly splitting the transmitted light into a plurality of output channels, filtering each of the plurality of output channels into a sensing light of a preselected wavelength range, transmitting the sensing light into a plurality of photodetectors corresponding to the output channels, and determining an attenuation of the sensing light with respect to the passive light source in the presence of a gas. Other embodiments of this aspect include corresponding computer systems, apparatus, and computer programs recorded on one or more computer storage devices, each configured to perform the actions of the methods.

Implementations may include one or more of the following features. The method of detecting gas in the atmosphere may include selecting the preselected wavelength range in a near infrared spectrum range. The gas includes an amount of methane gas and the attenuation is caused by the amount of methane gas. The method of detecting gas in the atmosphere may include determining a concentration of methane gas. The method of detecting gas in the atmosphere may include scanning an area of interest from a first position, determining the concentration of methane gas in the area of interest from the first position, and producing a first two dimensional grid of the concentration of methane gas in the area of interest from the first position. The method of detecting gas in the atmosphere may include scanning an area of interest from a second position, determining the concentration of methane gas in the area of interest from the second position, and producing a second two dimensional grid of the concentration of methane gas in the area of interest from the second position. The method of detecting gas in the atmosphere may include producing at least one two dimensional map of the concentration of methane gas of the area of interest using any of the first two dimensional grid of the concentration of methane gas in the area of interest from the first position and the second two dimensional grid of the concentration of methane gas in the area of interest from the second position. The method of detecting gas in the atmosphere may include a producing a three dimensional map of the concentration of methane gas of the area of interest using the first two dimensional grid of the concentration of methane gas in the area of interest from the first position and the second two dimensional grid of the concentration of methane gas in the area of interest from the second position. The area of interest includes any of a well pad, a pipeline, a storage tank, a refinery, an industrial processing facility and an agricultural facility. The method of detecting gas in the atmosphere may include producing a second digital image from the second position in coordination with the second two dimensional grid of the concentration of methane gas in the area of interest from the second position. The method of detecting gas in the atmosphere may include producing a first digital image from the first position in coordination with the first two dimensional grid of the concentration of methane gas in the area of interest from the first position. The passive light source includes light in the near infrared spectrum range. The passive light source may include sunlight. The splitting of the transmitted light can be performed by a fiber bundle having a plurality of sensing legs corresponding to the output channels. The splitting of the transmitted light can be performed by a beam splitter to split the sensing light into the plurality of output channels. The focusing optics assembly may include a lens. The filtering may include transmitting the sensing light at wavelengths between 1500 nm and 1750 nm. The determining the attenuation of the sensing light is performed within a field of view and a path length. Implementations of the described techniques may include hardware, a method or process, or computer software on a computer-accessible medium.

BRIEF DESCRIPTION OF THE DRAWINGS

So that the manner in which the above-recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following detailed description of the embodiments, reference is made to the accompanying drawings, which form a part hereof, and within which are shown by way of illustration specific embodiments by which the examples described herein may be practiced. It is to be understood that other embodiments may be utilized and structural changes may be made without departing from the scope of the disclosure.

Figure 1:
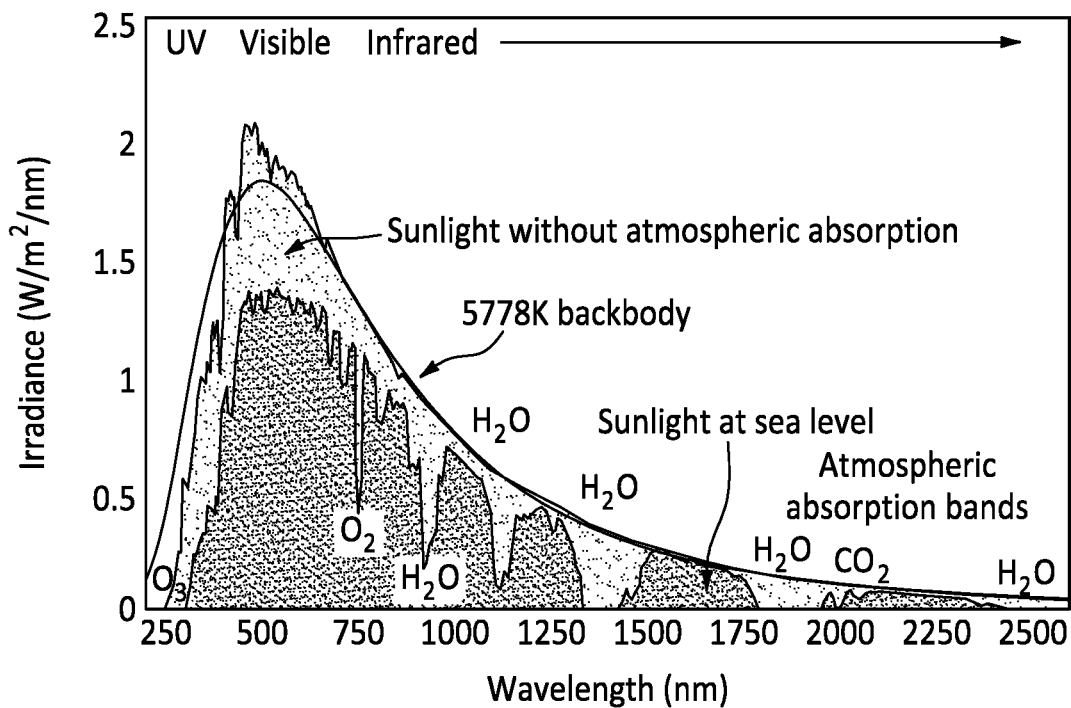
FIG. 1 is a graphical representation of solar irradiance versus wavelength for sunlight of the prior art.

The present disclosure provides for methods and systems for detecting and measuring methane gas in the atmosphere using a passive illumination source (sunlight for example) and detecting the relative transmission intensities at key wavelengths in the near infrared spectrum. Referring to FIG. 1, there is shown a graphical representation of the spectrum of solar radiation from the sun as it relates to the earth. The plot shows the irradiance energy against wavelength across the spectrum. As one skilled in the art can see, the amount of energy available in the near infrared spectrum range, specifically between about 1500 nm and 1750 nm, is not absorbed by normal atmospheric constituents such as $H_2O$ and $CO_2$ and therefor is efficiently transmitted at the earth's surface. Now referring to FIG. 2, there is shown a plot of the absorption bands for methane (CH4) for wavelengths of light up to 4500 nm. As can be seen, very strong absorption occurs between 3000 and 3500 nm. This is the range where most prior art methane detection optical devices operate with an active radiation source suitable for that range of wavelengths. It should be noted that active sources are typically the most expensive portion of a prior art methane detection device. While still referring to FIG. 2, and with reference back to FIG. 1, it can be seen that sunlight doesn't include appreciable light in these wavelength ranges making a measurement using passive sunlight radiation impossible. The range of wavelengths from about 1500 nm to about 1800 nm is of particular significance to the present disclosure. It should be apparent to those skilled in the art that there is no absorption by methane to light at 1500 nm which, as disclosed immediately herein above, is efficiently transmitted to the surface of the earth by the sun. Likewise it should be apparent that there exists significant levels of absorption by methane at wavelengths between about 1650 nm and 1750 nm. The methane absorption peaks shown between 2200 nm and 2650 nm, while significant, are also the same wavelengths at which atmospheric constituents such as $H_2O$ and $CO_2$ also absorb energy. In attempting to detect the presence of methane in this higher wavelength range it is difficult to separate the detection of methane with that of other constituents commonly found in the atmosphere. It should be appreciated that the cost and complexity of optics and opto-electronics for operation of devices at infrared wavelengths above 2000 nm increases dramatically.

Embodiments of the present disclosure can be used as a fixed-position methane monitoring device for detecting and quantifying fugitive emissions of natural gas composed primarily of methane from a producing oil or gas well pad, a gathering center, or similar facility, all of which may be referred to herein as a pad. As will be disclosed in greater detail herein below, a single methane monitoring device can be used to scan the pad and determine a two-dimensional concentration grid. Additionally, a second methane monitoring device can be positioned at a second perimeter location outside (or near the perimeter) of the pad producing a second two-dimensional grid and the two two-dimensional grids can be combined to provide improved source identification. In certain embodiments of the present disclosure, a two dimensional or three dimensional concentration grid can then be input into an air dispersion model to estimate a total emission rate and to pinpoint the source.

Figure 2:
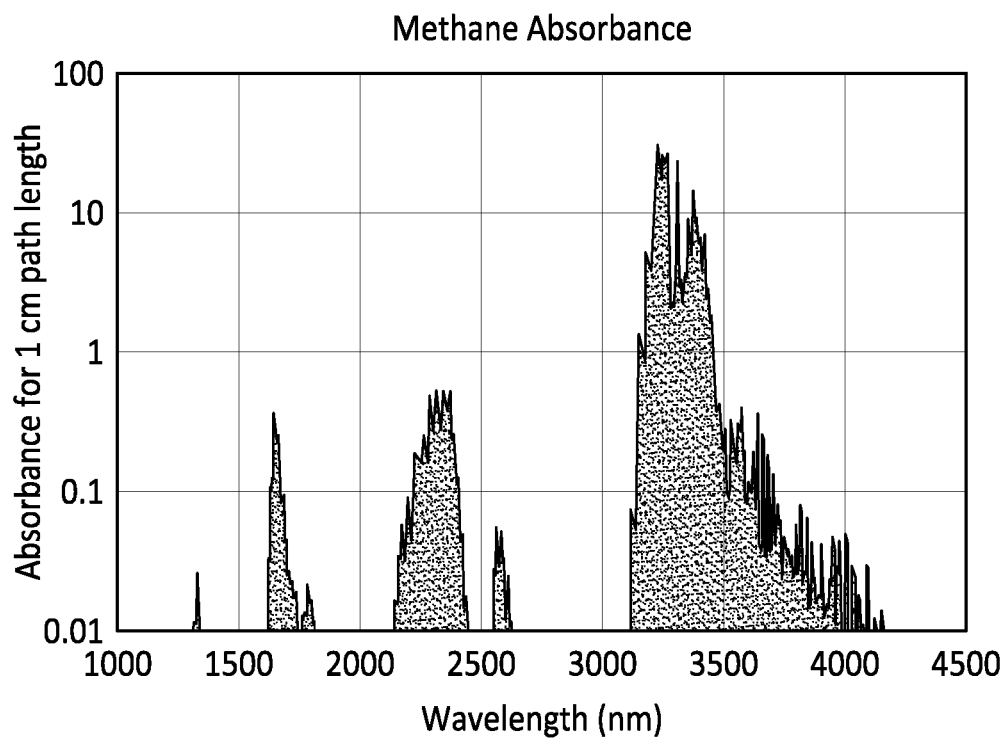
FIG. 2 is a graphical representation of the absorption of methane versus wavelength of the prior art.
Figure 3:
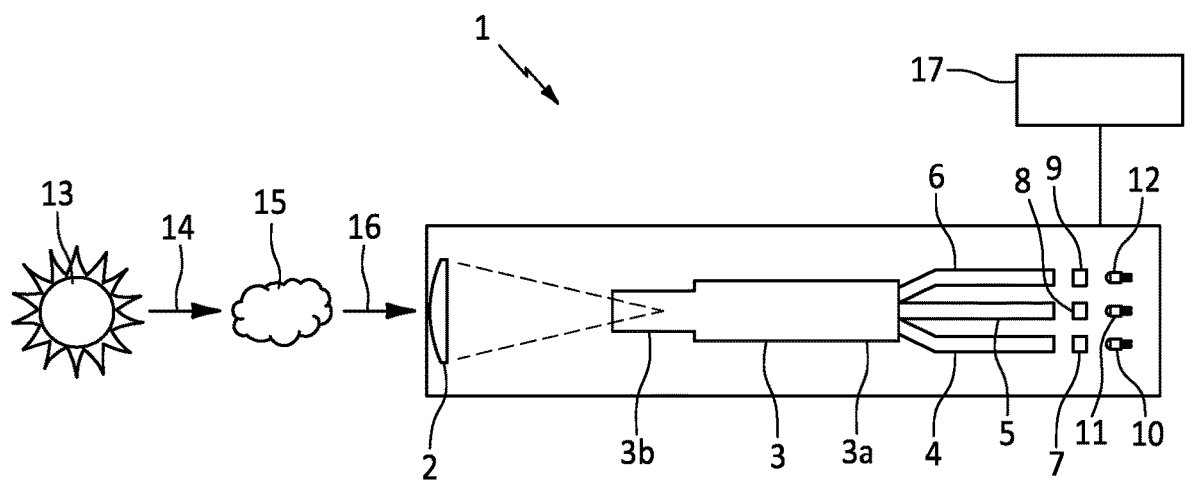
FIG. 3 is a schematic representation of a methane monitoring device in accordance with the present disclosure.

Referring now to FIG. 3, there is shown a gas monitoring device in the form of a methane monitoring device 1 in schematic form that can be part of a gas detection system. Methane monitoring device 1 includes focusing optics assembly 2, a light distribution device in the form of a fiber bundle 3, a plurality of output channels in the form of sensing legs 4, 5, 6, a plurality of narrow bandpass filter 7, 8, 9 and a plurality of photo detectors 10, 11, 12 and processing unit 17. Although methane monitoring device 1 is shown in this embodiment as having three output channels in the form of three sensing legs 4, 5, 6, it is within the scope of the present disclosure that a methane monitoring device can comprise two or more sensing legs. Focusing optics assembly 2 can comprise a lens network having a narrow field of view relative to the area to the monitored. Fiber bundle 3 includes common end 3a and collection end 3b and can comprise any number of optical fibers and in some embodiments includes more than 7000 optical fibers. Focusing optics assembly 2 focus transmitted radiation 16 to collection end 3b of fiber bundle 3. In this manner, fiber bundle 3 acts as a collector of transmitted radiation 16 from focusing optics assembly 2 into collection end 3a and an optical splitter at common end splitting the collected light into a plurality of sensing legs 4, 5, 6. Although shown as a fiber bundle, a beam splitter is contemplated by the present disclosure to collect the transmitted radiation 16 and split it into a plurality of sensing legs for presentation to a plurality of filters. In some embodiments the optical fibers can comprise borosilicate multimode fibers which are widely available, are of low cost and efficiently transmit light in the NIR range. Sensing leg 4 can be comprised of an optical fiber in optical communication at common end 3a with a first one third of the optical fibers in fiber bundle 3 and is further in optical communication with narrow bandpass filter 7. Similarly, sensing leg 5 can be comprised of an optical fiber in optical communication at common end 3a with a different and second one third of the fibers in fiber bundle 3 and is further in optical communication with narrow bandpass filter 8. Sensing leg 9 can be comprised of an optical fiber in optical communication at common end 3a with a third and different (from the first one third and second one third) bandpass filter 9. Photo detector 10 is adapted to receive sensing light that has been filtered by narrow bandpass filter 7. Photo detector 11 is adapted to receive sensing light that has been filtered by narrow bandpass filter 8. Finally, photo detector 12 is adapted to receive sensing light that has been filtered by narrow bandpass filter 9. Although shown as having three sensing legs it is within the scope of the present disclosure that methane monitoring device 1 can have any number of sensing legs optically coupled to common end 3*a* of fiber bundle 3 along with a commensurate number of paired narrow bandpass filters and photo detectors. Methane monitoring device 1 uses sun 13 as a radiation source wherein the sun emits broadband radiation 14 into the earth's atmosphere. As disclosed herein above with reference to FIG. 1, the sun emits radiation in the ultraviolet, visible and infrared spectrum ranges. In certain circumstances a methane plume 15 will be positioned between sun 13 and methane monitoring device 1 wherein a certain amount of radiation will be absorbed at the wavelength ranges disclosed herein above with reference to FIG. 2. In the absence of methane broadband sunlight 14 and transmitted radiation 16 will be equivalent in intensities for the wavelength bands of monitoring device 1, i.e. wavelength bands that are not affected by other atmospheric constituents like water and CO2. In the presence of methane and after passing through methane plume 15 broadband sunlight 14 will be filtered depending on the concentration of methane in the plume into transmitted radiation 16 wherein the radiation will filter wavelengths in accordance with the absorption bands of methane (FIG. 2). Processing unit 17 can comprise any type of computing unit and can be integral with methane monitoring device 1 or can be partially positioned remote therefrom but is adapted to receive the photo currents from photo detectors 10, 11, 12

Still referring to FIG. 3, it should be appreciated that methane monitoring device 1 that focusing optics assembly 2 couples transmitted light 16 to fiber bundle 3 which is in turn coupled to sensing legs 4, 5, 6 in a randomized way such that each of the sensing legs receives and transmits an equal optical signal to the narrow bandpass filters 7, 8, 9. In certain embodiments a light pipe homogenizing rod (not shown) can be positioned between focusing optics assembly 2 and fiber bundle 3 to assist in producing an equal optical signal. Each fiber bundle leg 4, 5, 6 is optically coupled to narrow band pass filter 7, 8, 9 respectively which filters block all of the transmitted radiation except for the band of interest as will be described in more detail herein below. Photodetectors 10, 11, 12 are selected from a group of NIR sensitive photodetectors, and in one embodiment they can be, for example, Indium Gallium Arsenide (InGaAs) detectors coupled to narrow bandpass filters 7, 8, 9 respectively to provide a measure of the filtered transmitted radiation 16 by outputting a current proportional to irradiance energy of the filtered transmitted radiation. The photo conductive sensors 10, 11, 12 have very low-level detection capabilities without the need for cooling as is often the case for Mid-IR detectors. The available NIR detectors respond linearly over a very wide range allowing for a wide range of concentration measurement.

Fiber bundle 3 has a number of advantages over other lensing systems of the prior art designed to divide the optical transmission of transmitted radiation 16. It should be appreciated by those skilled in the art that fiber bundle 3, having a plurality of optical fibers offers excellent randomization of transmitted radiation 16 by dividing the light amongst the plurality of optical fibers. In addition, the individual optical fibers in fiber bundle 3 provide perfect isolation wherein there is no bleed over from fiber to fiber or from the sensing legs 4, 5, 6 providing clean channels to the narrow bandpass filters 7, 8, 9. The measured transmission for a given photodiode 10, 11, 12 is only the transmitted radiation 16 that passed through that respective channel's band pass filter 7, 8, 9 also referred to herein as sensing light. The combination of these optical components provides for a large effective absorbance measurement range for each channel.

It should be further appreciated by those skilled in the art that the Mid-IR range is suitable for spectroscopic analysis and that NIR is often considered to have a number of disadvantages. As described herein above with reference to FIG. 2, one such perceived weakness of the NIR region in spectroscopic analysis is the fact that absorption bands for methane in the NIR region at wavelengths between about 1650 nm and 1750 nm are overtones of the fundamental bands in the Mid-IR region between about 3000 nm and 4000 nm. The absorption bands between about 1650 nm and 1750 nm are considerably weaker and spread out in terms of wavelengths. In spectroscopic analysis where the objective is to measure the composition of an unknown hydrocarbon gas mixture it is much better to detect the major peaks precisely related to specific wavelengths to "finger print" the composition. In the methane monitoring device 1 of the present disclosure concentrating on the weaker and broader absorption band is highly advantageous. The methane monitoring device 1 is configured to determine whether or not methane (specifically) is present and to determine the meaningful range of concentration across a long path length (e.g. the perimeter of a well pad or gathering station as will be disclosed more fully herein after). Methane monitoring device 1 is not configured to identify an unknown gas mixture or even quantify the composition of a natural gas mixture so there is little benefit to work in the 'finger print' Mid-IR region. Methane monitoring device 1 is configured to differentiate methane from other constituents that are present in the atmosphere including air and water vapor. It should be noted that in embodiments of the present disclosure it is not necessary to be able to differentiate methane from other complex hydrocarbons as the presence of methane will be detected even within mixtures of methane with other hydrocarbon components. Using the methane overtones in the absorption bands between about 1650 nm and 1750 nm is advantageous because the goal is to have enough absorption to offer measurable absorption differentiation at the lowest detection target but also to have enough transmission to make a measurement across a wide range of methane concentration. As will be disclosed in more detail herein after, methane monitoring device 1 is not only capable of detecting the presence of methane in the atmosphere (i.e. from a leak) but to also characterize the amount of methane present (i.e. the severity of the leak). A lower methane absorbance (using a range that has lower absorption coefficients) allows the methane monitoring device 1 to measure higher methane concentrations across a long path than would be possible with higher absorbance. It should be appreciated by those skilled in the art that light attenuation is exponentially related to path length. With a strong absorption coefficient, the absorption bandwidths quickly attenuate all the transmitted radiation as methane plume 15 gets bigger. In addition, methane monitoring device 1 utilizing broader absorption bands offers advantages from an available optical power perspective. For example, a broader band pass filter can be used for bandpass filter 7, 8, 9 which translates into more optical power for detection by photo detectors 10, 11, 12. The use of a broader absorption band enables methane monitoring device 1 to operate as a passive system using sunlight 14 for the radiation source rather than an active source found in the prior art. As discussed herein above with reference to FIG. 2, methane monitoring device 1 advantageously uses the available NIR radiation from the sun 13 which is orders of magnitude higher than Mid-IR radiation that reaches the earth's atmosphere. Methane monitoring device 1 is thus configured to use broader wavelength ranges in the NIR region coupled with the fact that the available NIR radiation found in sunlight 14 is much higher than the available radiation found for Mid-IR as disclosed herein above with reference to FIG. 1. The term passive light source as used herein includes the sun as a light source, but can include alternative sources that include the NIR wavelengths of interest including, for example, ambient light occurring in the atmosphere incident to methane measurement device 1 not purposefully placed to provide a dedicated source of light and not powered by the methane measurement device.

Figure 4:
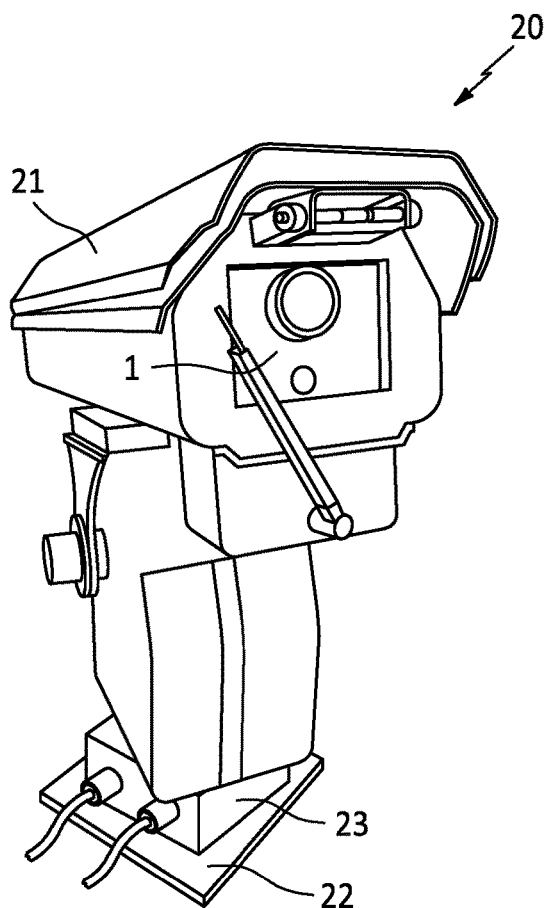
FIG. 4 is a three dimensional depiction of a methane detection system in accordance with the present disclosure.
Figure 7:
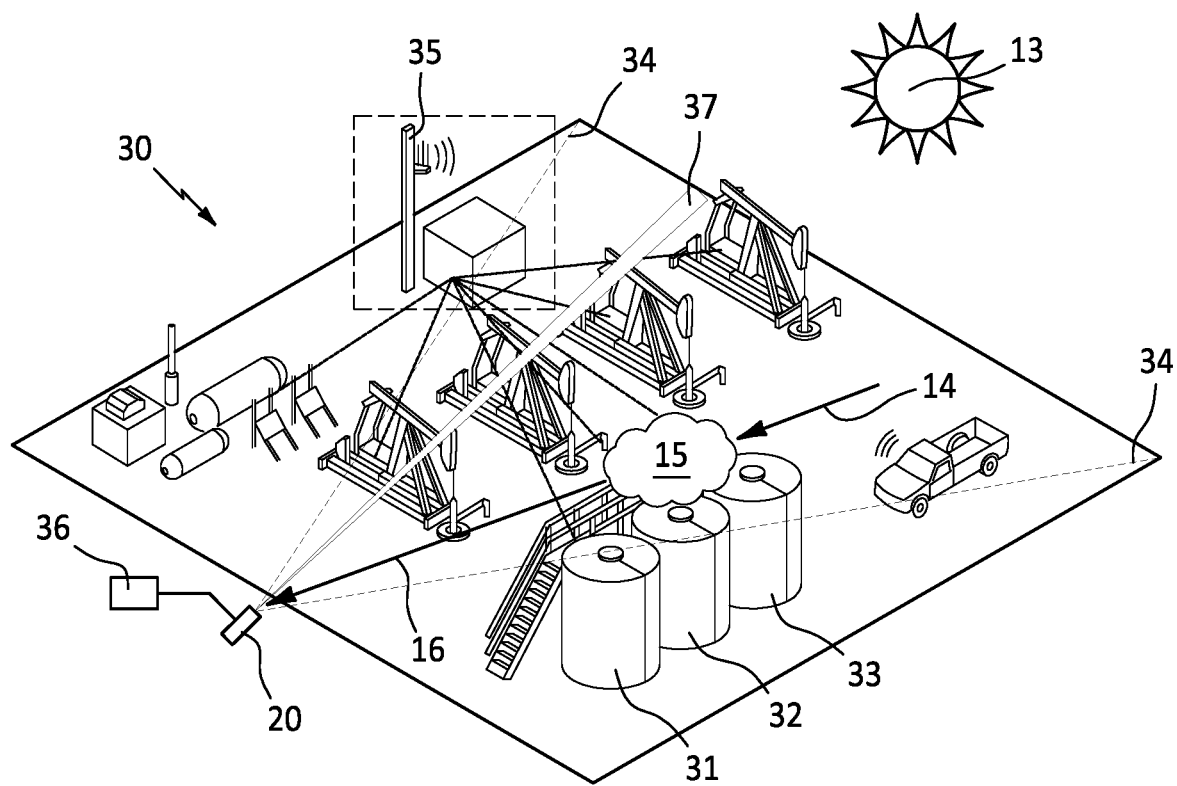
FIG. 7 is a schematic representation of a methane detection system in accordance with the present disclosure.

Now with reference to FIG. 4, there is shown a remote methane monitoring system 20 that includes a housing 21 and a base 22. Methane monitoring device 1 is positioned within housing 21 to provide protection form the elements when used outdoors as well as a positioning device such as servo motors 22, 23 configured to control and configured to position, respectively, the panning direction and tilting direction of the methane monitoring device to cover a broader surveillance area, i.e. increase the NIR scope of the methane monitoring device, as will be described more fully herein after. Base 22 is shown as a baseplate but can include any portable mounting device (including a tripod) or permanent mounting of methane monitoring system 20 that provides for a stable position of the device at a predetermined location and can include a motorized pan and tilt feature. In certain embodiments of the present disclosure methane monitoring system 20, and methane monitoring device 1 thereby, can be positioned around the periphery of a facility that uses, processes or contains methane. Once such facility is best described with reference to FIG. 7 depicting a typical oil and gas pad 30. Pad 30 contains a plurality of equipment common in the oil and gas industry including storage tanks 31, 32, 33. methane monitoring system 20 is positioned at the periphery of pad 30 such that the total field of view depicted by path length 34 includes all of the equipment of interest in terms of methane monitoring. As disclosed herein above, methane measurement device comprises a narrow field of view depicted by effective field of view 37. As will be described in more detail herein after, effective field of view 37 is scanned across the entire area of interest with respect to pad 30. In the particular embodiment shown there exists a methane plume 15 above storage tank 32. In operation, and with methane monitoring device 1 pointed in the direction of methane plume 15, the natural radiation from sunlight 14 passes through the methane plume and is preferentially absorbed (partially) at the wavelength band corresponding to the methane overtone between about 1650 nm and 1750 nm. The transmitted radiation 16 (after absorption by the methane plume 15) enters methane monitoring device 1 through focusing optics assembly 2 and is focused onto fiber bundle 3 and distributed in a randomized fashion such that each sensing leg 4, 5, 6 has a nearly identical optical transmission of the transmitted radiation. It should be noted that this technique is not configured to capture a NIR image as it is not used in the technique of monitoring and quantifying methane in the atmosphere as disclosed herein. The sum total of optical power from transmitted radiation 16 within the effective field of view 37 is divided into two (or more) optical pathways (defined by the sensing legs, filters and photodetectors) for detection. The available optical power for each of the photodetectors 10, 11, 12 is a full third (or half in embodiments having only two pathways, etc.) of the total transmitted radiation 16 before respective filtering using relatively wide bandpass filters 7, 8, 9 made possible by the broad band NIR absorbance. The ability to use such relatively wide bandpass filters chosen from a preselected wavelength range enables methane monitoring device 1 to use sunlight 14 as a passive light source. Although shown as monitoring an oil and gas facility, it is within the present disclosure that methane monitoring device 1 can be used for detecting a gas generally, and for detecting methane more specifically, at other areas where methane may be present including a well pad, a pipeline, a storage tank, a refinery, an industrial processing facility and an agricultural facility.

The photocurrents from the photo detectors 10, 11, 12 are fed to a processing unit 17 (FIG. 3) for processing. Baseline calibrations are determined by recording transmissions from a field of view of methane monitoring device 1 reasonably free of methane. In some embodiments it may be preferable to record a baseline calibration for each view (grid position). The bandpass filters 7, 8, 9 that define each of the channels are selected to pass only wavelengths of interest. In one embodiment, one wavelength band is located at a methane overtone absorbance band, one band where there is a second methane overtone absorbance band, and one band where there is no significant absorbance related to methane or water. In another embodiment, the second wavelength band can be located in the area where $C_2+$ hydrocarbons absorb. For instance, to detect the overtones of methane two of the three filters can be selected from predetermined wavelength range between 1650 nm and 1750 nm and in one embodiment wide bandpass filter 7 is selected around a center wavelength of 1655 nm and wide bandpass filter 8 is selected around a center wavelength of 1730 nm. In one embodiment, the third channel comprising wide bandpass filter 12 can be configured to measure at a water absorption band outside of the methane overtone range and in one embodiment is selected around a center wavelength of 1585 nm. The calibration procedure may be corrected for angle above the horizon to account for variable effective atmosphere layer. The calibration procedure of the present disclosure can also take in account local humidity.

Processing unit 17 uses instructions in computer code to calculate methane concentration from the Beer-Lambert law in accordance with the following equation:

$$A = -\log_{10}\frac{I}{I_0} = abc \qquad \text{(Equation 1)}$$

Where:
A=Absorbance
I=measured photocurrent
$I_0$=reference photocurrent (calibration as disclosed herein above)
a=absorption coefficient per unit path length
b=path length
c=concentration In the current embodiment there exists one absorbance equation for every channel defined by the sensing leg, filter and photo detector combination. In such an embodiment the three channel system can be represented in accordance with the following equation:

$$A_\lambda = a_{m\lambda}bc_m + K \qquad \text{(Equation 2)}$$

Where $A_\lambda$=Absorbance for a specific wavelength $a_{m\lambda}$=absorption coefficient for methane for a specific wavelength b=path length $c_m$=methane concentration K=non wavelength dependent common mode attenuation factor In certain embodiments where a relatively broad band pass filter is used that spans a range of wavelengths with varying absorptions, the resulting transmittance varies by wavelength as well as by methane concentration. The combined transmittance, as measured by a broad range detector (e.g. an InGaAs photodiode) can be represented as follows:

$$\sum_{i=\lambda_{min}}^{\lambda_{max}} I_{\lambda_i} = \sum_{i=\lambda_{min}}^{\lambda_{max}} I_{0,\lambda_i} * 10^{-\left(a_{m\lambda_i}bc_m+K\right)} \quad \text{(Equation 3)}$$

Where:

$\lambda_{min}$=the shortest wavelength where the narrow bandpass filter allows transmission $\lambda_{max}$=the longest wavelength where the narrow bandpass filter allows transmission $I_{\lambda_i}$=Transmission at a specific wavelength within the narrow bandpass filter band $I_{0\lambda_i}$=Calibrated baseline transmission at a specific wavelength within the narrow bandpass filter band With a broad band pass filter, one cannot isolate and measure the individual wavelength transmissions nor calibrate for individual baseline transmissions. One can, however, measure the collective transmission values and a collective absorbance value defined as follows:

$$A_{\lambda_R} = -\log_{10}\frac{I_{\lambda_R}}{I_{0\lambda_R}} \quad \text{(Equation 4)}$$

Where:

$I_{\lambda_R}$=Measured transmission for the range of wavelengths spanned by the narrow bandpass filter $I_{0\lambda_R}$=Calibrated baseline transmission for the range of wavelengths spanned by the narrow bandpass filter The difference in the full range absorbance for different narrow bandpass filters is monotonically related to methane concentration. This relationship can be determined by calibration with a test cell with varying methane concentrations. Using a differential absorbance removes common mode effects.

Figure 5:
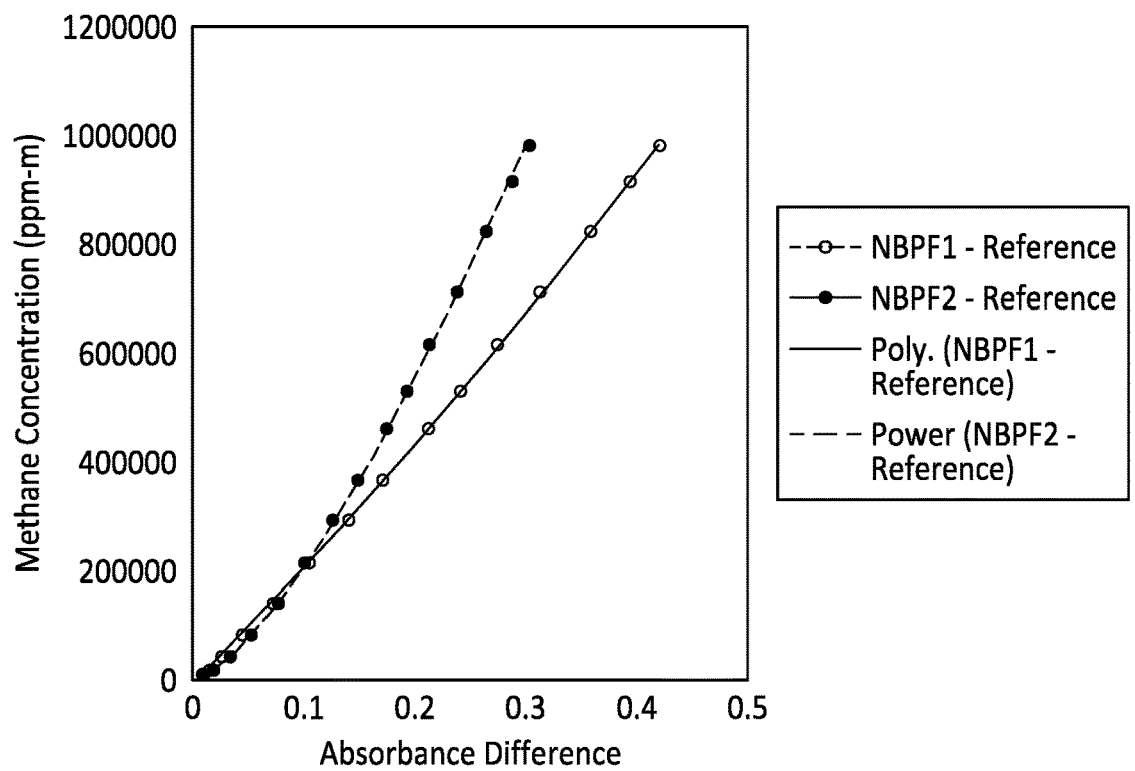
FIG. 5 is a graphical representation of a response curve of a methane detection system in accordance with the present disclosure.

FIG. 5 shows actual measurements of methane concentration versus differential collective absorbance for two narrow bandpass (NBPF) filters (specifically an NBPF-1 filter and an, NBPF-2 filter). For both filters, the differential measurement is made relative to a reference narrow bandpass filter spanning a non-methane absorbing band of wavelengths. The methane concentrations are reported in parts per million per meter (ppm-m). An empirical curve fit of methane concentration vs differential absorbance provides a robust predictive model for that pair of narrow bandpass filters. It should be appreciated by those skilled in the art that while the curve fit may be empirical, the underlying fundamental relationship is still governed by the Beer-Lambert law (Equation 1). It should be noted that the shape of each curve is a reflection of the set of wavelengths and the corresponding absorption coefficients that make up the range.

Figure 6:
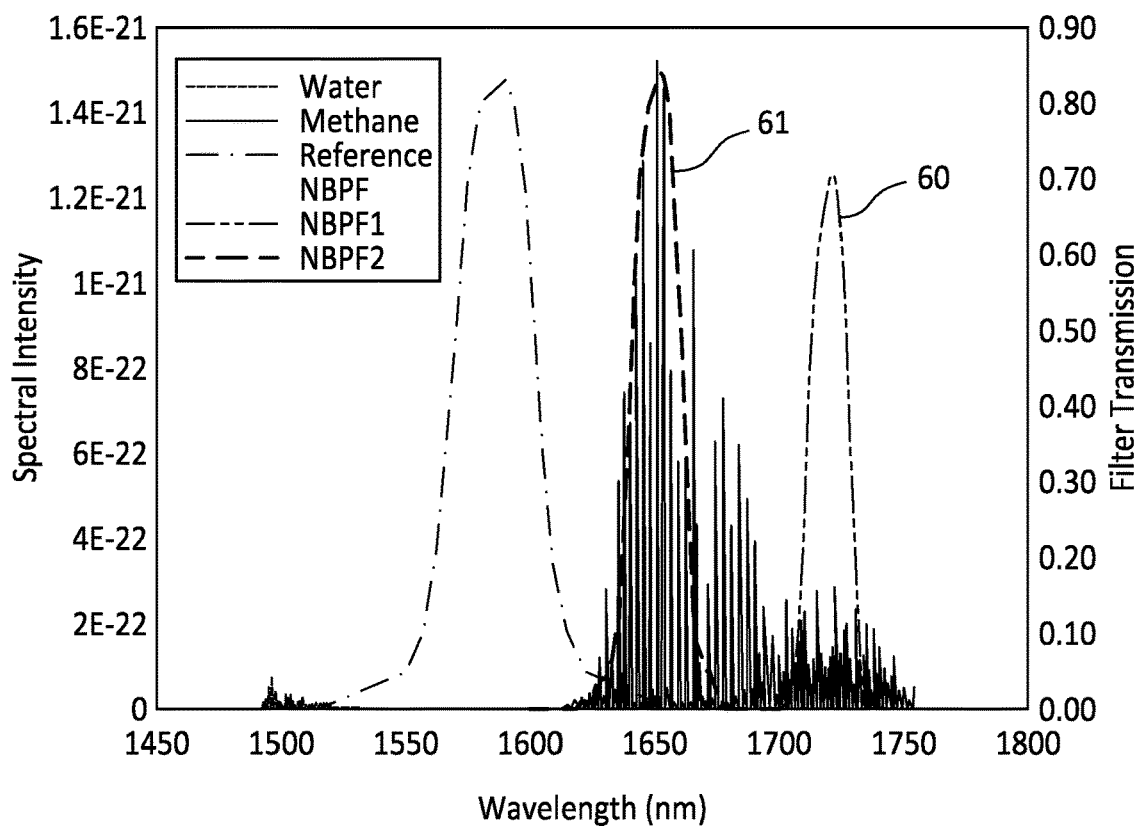
FIG. 6 is a graphical representation of methane absorption and filtered transmissions as a function of wavelength in accordance with the present disclosure.

In FIG. 6, it is shown by curve 60 that the NBPF-2 filter spans a range of wavelengths that includes both relatively high methane absorption coefficients and relatively low values. It is further shown by curve 61 that the NBPF-1 filter spans a range with more uniform methane absorption coefficients. As would be expected by those skilled in the art, the response curve (FIG. 5) for the NBPF-2 filter shows higher sensitivity at low methane concentrations due to the wavelengths with high absorption coefficients but then asymptotically approaches a differential absorbance that is determined by the wavelength regions with low absorption coefficients. The NBPF-1 filter with a more uniform absorption coefficient appears more linear over the plotted methane concentration shown.

Either curve can be used to determine methane concentration, or they can both be used to improve measurement confidence. Other narrow bandpass filter ranges can also be used and calibrated with a windowed test cell and a range of methane concentrations without departing from the scope of the present disclosure.

In another embodiment, only two channels are measured. The narrow bandpass filter for one channel may span a range of wavelengths where methane has little or no absorbance and the narrow bandpass filter for the second channel may span a range of wavelengths where methane does absorb. A single differential absorbance vs methane concentration can be determined through calibration and used for concentration measurements. In another embodiment with three channels, a second channel can be used where the C2+ hydrocarbon gases have a stronger absorption than does methane. The third channel includes a filter selected to isolate the overtones for methane as disclosed herein above. In such an embodiment and similar to that disclosed herein above, processing unit 17 of methane monitoring device 1 can be used to determine the relative concentrations of methane and C2+.

Using one or more of the narrow bandpass filter response curve equations, the methane concentration for a given field of view of methane monitoring device 1 can be calculated by processing unit 17. If the wavelengths of bandpass filters 7, 8, 9 are selected where the water absorption is not constant then at least 3 wavelengths are needed to solve for the methane concentration, the water concentration, and the K factor. If wavelengths of bandpass filters 7, 8, 9 are selected where water absorption is similar but C2+ absorption varies then again at least 3 wavelengths are needed. More wavelengths (and consequently absorbance equations) can be used and a least squares solution can be applied for an over defined set of equations.

Figure 8:
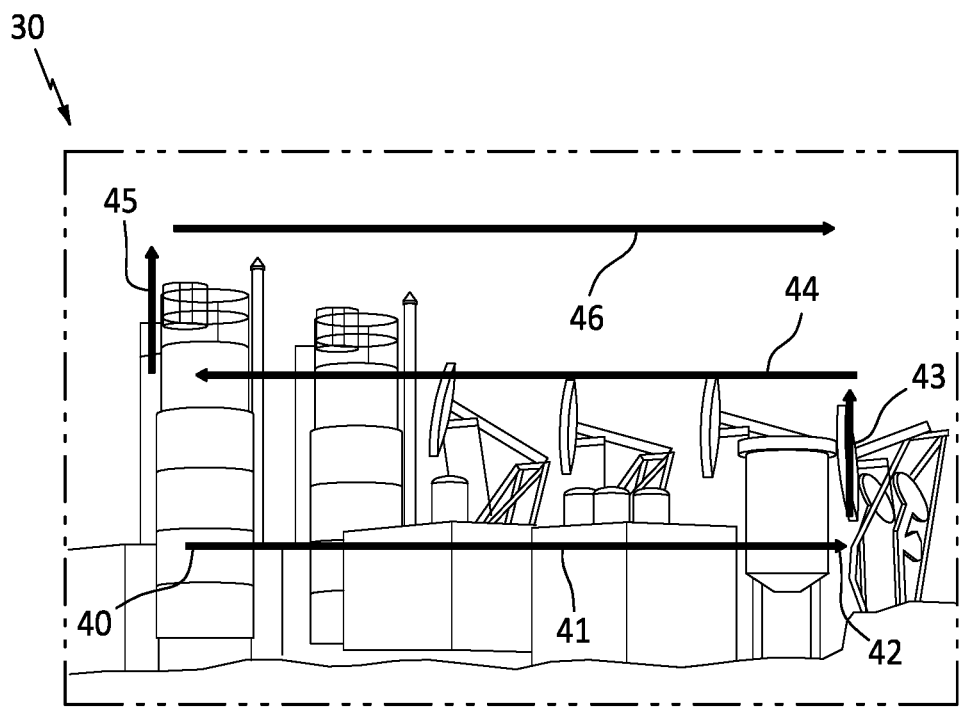
FIG. 8 is a two dimensional depiction of a scanning method a methane detection system in accordance with the present disclosure.
Figure 9:
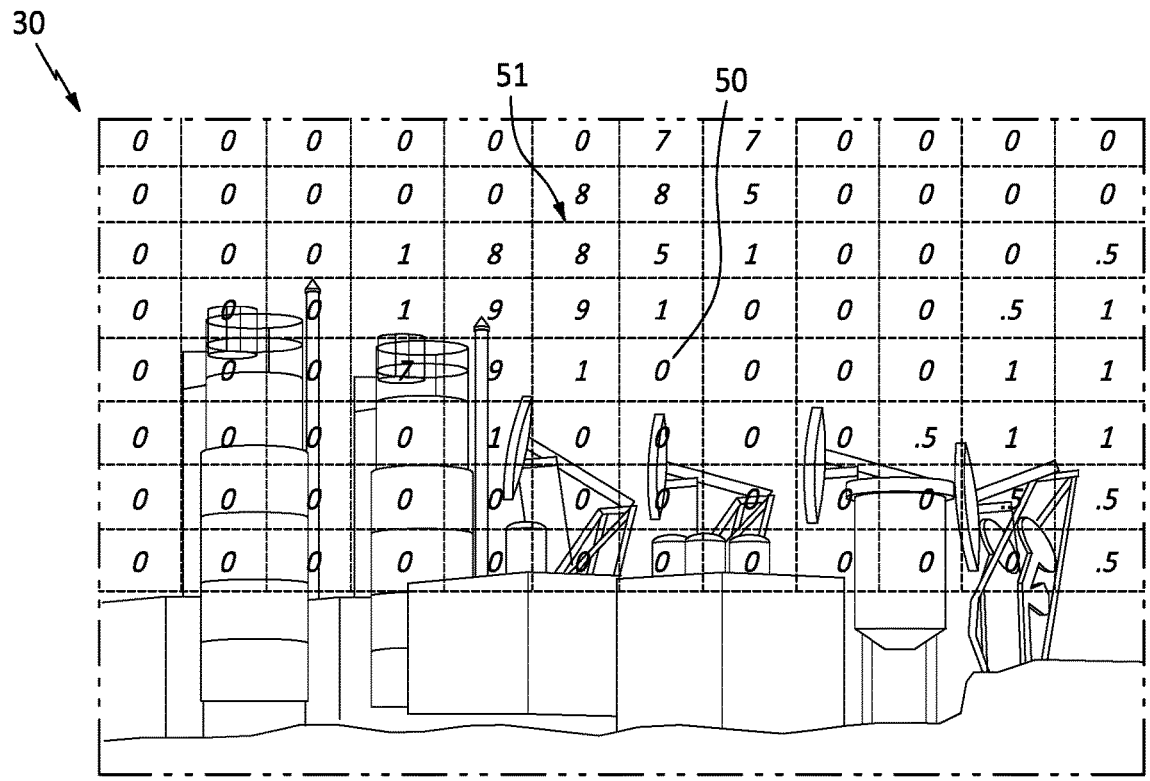
FIG. 9 is a two dimensional depiction of a concentration grid of a scanning method a methane detection system in accordance with the present disclosure.

The methane monitoring device is designed to scan the effective field of view 37 across the entire well pad 30. The transmitted radiation 16 is collected with focusing optics assembly 2 that have a relatively narrow field of view. The subsequent methane concentration measurement at a particular moment will be specific for that particular effective field of view 37. The effective field of view 37 can be scanned across pad 30 from side to side and at varying pitch angles to obtain methane concentration measurements covering the entire area of interest. The methane concentration measurements can be reported in the form of a 2 dimensional grid. The reported methane concentration grid size can be larger or smaller than the field of view. In one embodiment the field of view is about 4 times the grid size used for reporting. This relationship can be adjusted and optimized in different embodiments. For grid spacing smaller than the effective field of view 37, a deconvolution algorithm is used to calculate methane concentrations for the desired grid dimension. In certain embodiment of a methane detection system 20 of the present disclosure a gyroscope is included within housing 21 in the system and attached to the NIR lens system to provide 3 dimensional position coordinates to the field of view. Now with reference to FIG. 8 there is shown a pad 30 from the point of view of the focusing optics assembly 2 of methane monitoring device 1 showing the entire pad. As disclosed herein before, the effective field of view 37 of methane monitoring device 1 is relatively small and substantially smaller than the area of pad 30. In order to capture the entire pad methane monitoring device is moved across the horizontal distance of pad 30 by a first servo motor in housing 21 in a panning direction. In other embodiments, the pan and tilt features can be incorporated into housing 21. Then methane monitoring device 1 is moved in the vertical direction by a second servo motor in a tilt direction. For instance, a scanning sequence can start with methane monitoring device 1 aimed at starting point 40 and then it is panned sequentially in an increment equal to the effective field of view 37 along horizontal line 41 until the right hand edge of the area of interest has been scanned. The methane monitoring device is then tilted upward along vertical line 42 an amount equal to the effective field of view 37 and then it is panned sequentially in an increment equal to the effective field of view 37 along horizontal line 43 until the left hand edge of the area of interest has been scanned. The sequence is continued along horizontal line 44, vertical line 45 and horizontal line 46 until the entire area of interest is scanned. Once the scan sequence has been completed (perhaps 30 seconds but the scan time can be variable), the measured concentrations are recorded as a function of pan and tilt position. This sequence results in the production of a two dimensional grid 50 comprised of i number of grids forming rectangles as shown in FIG. 9. In certain embodiments of the present disclosure, methane monitoring device 1 can be configured to stop at fixed points along a scan to collect and average measurement data for improved performance. In still other embodiments, a user selectable number of rows and columns in the grid and positioning the FOV at the center of each grid space for a predetermined period of time (e.g. ~10 seconds) can be realized. In certain embodiments, a digital imaging device, such as a digital camera, can be mounted to the housing and can be configured to produce digital images of the area of interest that is being scanned in coordination with the two dimensional grid and the field of view with a visual image of the area of interest (FIG. 9).

In operation, methane detection system 20 is first calibrated as discussed herein above and can be performed in any known way. In one embodiment, a scan of the well pad 30 perimeter can be done during an initial set up of methane detection system 20 when it is known that there are no methane leaks (e.g. after a survey with a hand held IR camera). The scan, performed as described immediately herein above, can be recorded with $I_o$ as a function of grid location along two dimensional grid 50 along with time of day and even time of year. The recording can be hosted on processor 17 or at a remote location such as in the cloud or a remote server (not shown). Repeat calibration scans and calculations can be done at different times of day to characterize baseline transmission for optimal system sensitivity. Optimal performance of the methane detection system 20 may be achieved by running a monitoring scan at the same time of day for daily tracking processes. The methane detection system 20 can further be operated continuously or semi continuously throughout the full day as conditions warrant.

It should be noted that path length 34 (FIG. 7) for a passive system that includes objects in the foreground can be complex. For the purposes of this measurement, path length can be treated as a constant value equal to one meter. Concentrations can be reported as ppm-m as if the total methane across the pad within the field of view were condensed into a one meter path length. It can be assumed that source radiation 14 from the sun 13 is equal to the calibration level intensity ($I_0$) as it enters the well pad perimeter 30. This calibration level intensity ($I_0$) can be a function of grid space and daytime as described above. For the purposes of leak detection and emission quantification, the methane concentration can be assumed to be evenly distributed for a given grid block of two dimensional grid 50 across the entire imaginary path length. If, for example, a methane plume extended beyond the well pad perimeter due to wind it would be acceptable to treat it as a higher concentration within the confines of the set diameter path length. It should be appreciated by those skilled in the art that the methane detection system 20 cone shaped field of view will automatically discount the contribution of airborne methane far from the unit. As the distance from methane detection system 20 increases, the area of the effective field of view grows with the square of the radius. The amount of methane in the field of view required to provide the same absorbance is proportional to the area of the field of view at that distance. The angular nature of the field of view means the radius grows with distance. In one embodiment the acceptance angle is such that for a distance that is double the distance from methane detection system 20, four times as much methane is required to provide the same total absorbance.

It is sufficient to calculate concentration as if the path length were fixed and common for all NIR 'views' within grid 50. In such a method of calculation there is no need to determine complex path lengths for a particular effective field of view 37 (near or far obstructions) and concentration determinations are normalized as if they were compressed to a one meter path length for a given grid i.

Referring to FIG. 9, once a scan sequence has been completed, methane concentrations can then be assigned to each grid block. In one embodiment, a visual video camera can be combined with a relatively narrow field of view optical lens system designed to measure NIR transmission at 3 narrow wavelength bands. The methane concentration grid can be overlayed onto the visual image for enhanced user interpretation. Such a visual representation of the grid, as shown in FIG. 9 may be overlayed onto a visual snapshot or visual video capture to enhance user interpretation. That grid 50 can be marked with numbering and/or shading for example to highlight regions of high methane concentrations. In the embodiment shown the numbers range from 0 (no methane present) to 9 indicating a high presence of methane. The methane plume is shown generally within the grids, such as grid 51 having the higher number from the lower left and traversing diagonally to the upper right of the image. The data can be reported as a video with an overlay updated regularly after each scan, or as a snap shot with an overlay as shown in FIG. 9, or as a series of numbers with concentrations and grid coordinates, or as a simple leak alarm message. The report can be tailored to the user's existing data communications infrastructure.

Figure 10:
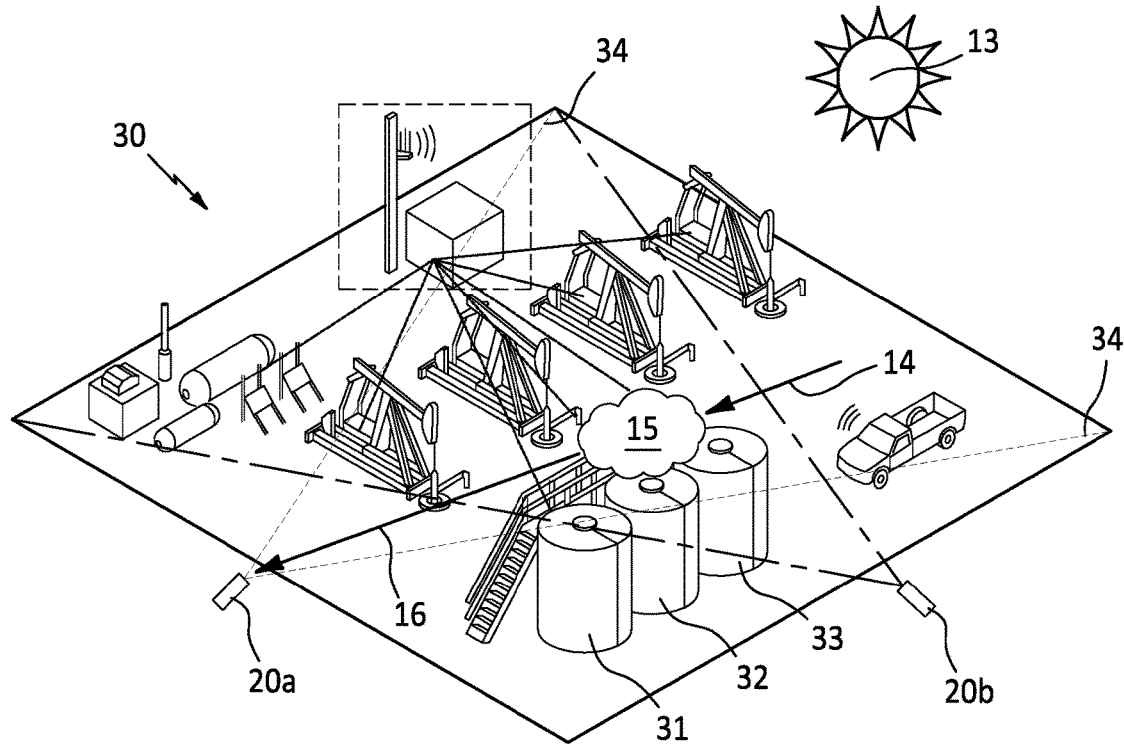
FIG. 10 is a schematic representation of a methane detection system in accordance with the present disclosure.

Now with reference to FIG. 10, there is shown an embodiment of a methane detection system of the present disclosure that includes methane detection systems at different positions and includes a first methane detection system 20*a* positioned on a periphery of pad 30 and a second methane detection system 20*b* positioned roughly orthogonal to the first methane detection system on the periphery of the pad. With second methane detection system 20*b* positioned at a location around 90° from the first device, the two resulting 2 dimensional grids can be used to better pinpoint the leak source. In some instances, the two 2-dimensional grids can be mathematically combined to produce a 3 dimensional grid concentration map (not shown) given some restrictions. (e.g. provided a significant portion of a grid shows no methane concentration). It should be appreciated by those skilled in the art that this embodiment can be used to better pinpoint the leak source. As disclosed herein above, methane detection systems 20*a*, 20*b* have a narrow field of view which in effect creates a long cone along the pathlength of the monitoring path. The light travelling in that cone toward the focusing optics assembly will be collected for the measurement as disclosed herein above. If methane is in the atmosphere anywhere in that entire cone, the methane will cause attenuation of the methane absorbing channel. It should be appreciated that the distance from the detection system to the methane along the cone can greatly affect the concentration of the methane. As an example, for a given volume of methane gas in the atmosphere of 1 m$^3$, the concentration in ppm per meter depends on the diameter of the cone at that point. That volume of methane positioned a relatively short distance from the detection system will result in a relatively high apparent concentration. The same 1 m$^3$ volume of methane gas located at spot a relatively longer distance from the detection system will result in a much lower apparent concentration. In embodiments of the present disclosure, the detection system will report methane concentration as a concentration in ppm-m. It should be noted that is important to know how far along the cone of detection the methane is located in order to convert concentration into volume of methane to determine total emission rate. In embodiments of the detection system of the present disclosure, the estimated distance from the detection system to methane source (tank 31 for example) is a parameter that can be entered into the processor 17 and used in the total emission rate calculation. In some embodiments, a distance from the detection system 20*a*, 20*b* to the center of the well pad 30 can be entered into processor 17 and will yield reasonably accurate readings. The concentration measurements can be reported for any pan and tilt position of the detection systems 20*a*, 20*b*. The detection systems 20*a*, 20*b* can continually measuring the methane concentration in their respective fields of view.

It should be apparent to those skilled in the art that a grid, such as grid 51, is established, the grids represent a rectangular pyramid. In general, the grid area can be greater than, roughly equal, or less than the field of view area for the measurement. When the field of view area is less than or roughly equal to the grid area, the grid concentration can be set equal to the reported concentration for that field of view. When the field of view area is larger than the grid area, a deconvolution algorithm can be applied. The deconvolution can be a simple matrix wherein each field of view measurement is equal to contributions from multiple grid rectangle concentrations weighted by area. In certain embodiments of the present disclosure, the two dimensional grid of FIG. 9 can be a conversion of the actual cone field of view concentration measurement to a rectangle pyramid. This can be equal to the reported field of view concentration measurement for the pan and tilt position of a detection system corresponding to the center of any particular corresponding grid. When the cone area is much larger than the grid area, a deconvolution calculation can be done. As disclosed herein above, a three dimensional grid map can be established and in one embodiment detection systems 20*a*, 20*b* is are positioned at an angle to one another and are shown orthogonal with each recording a corresponding orthogonal two dimensional grid. Each corresponding orthogonal two dimensional grid is, in essence, a two dimensional projection that is the sum of the methane concentrations along that axis in the three dimensional space. A two dimensional map and a three dimensional map of the area of interest can be generated using the above disclosed concentration grids.

Figure 11:
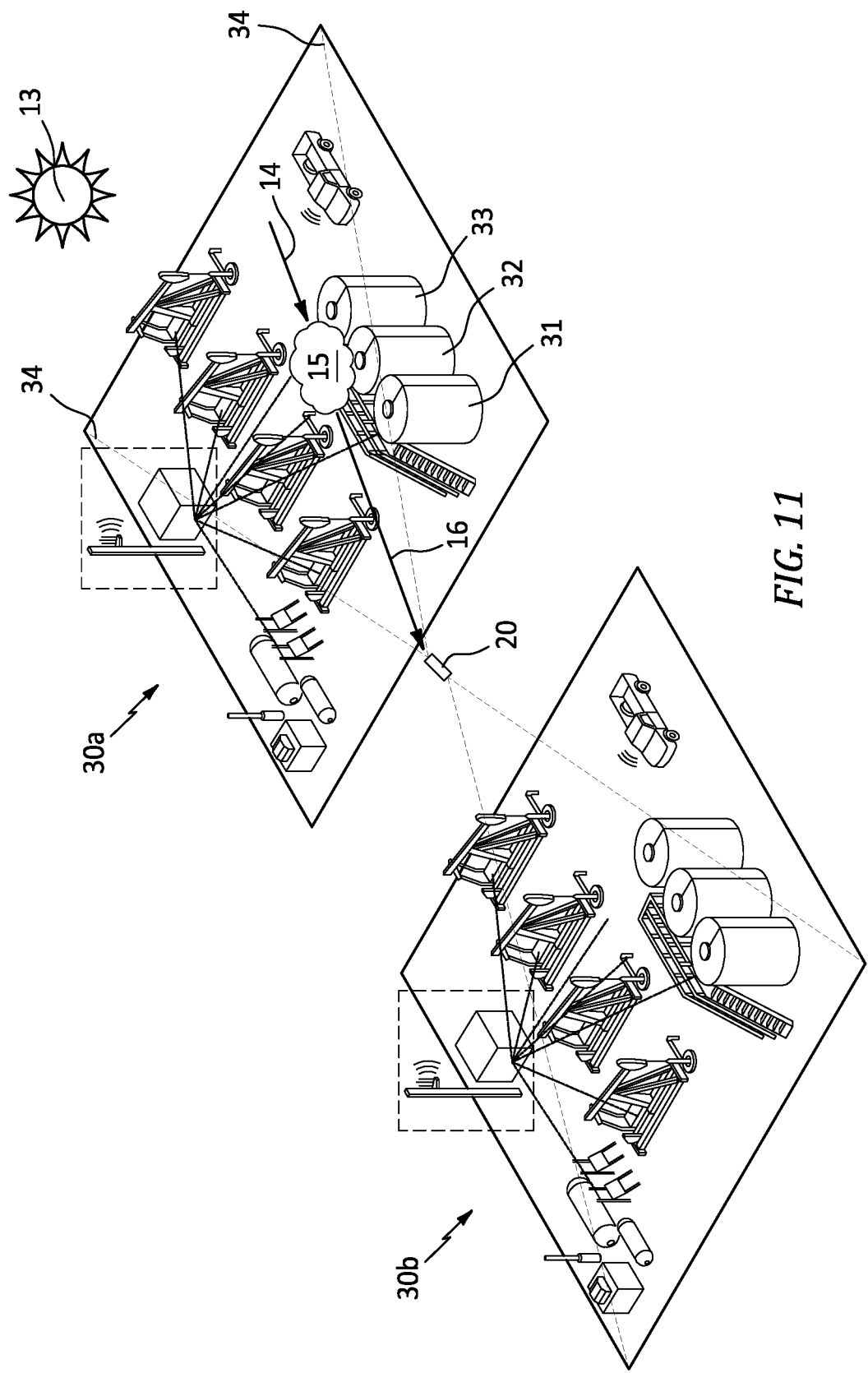
FIG. 11 is a schematic representation of a methane detection system in accordance with the present disclosure.

Now with reference to FIG. 11 there is shown another embodiment comprising a pair of pads 30*a* and 30*b*. In this particular embodiment an additional pan motor 23 can be added to rotate the housing 21 if a single methane monitoring system 20 is needed to scan more than one well pad 30*a*, 30*b* positioned in close proximity to one another. The methane monitoring device 1 pan and tilt features positioned within (or coupled to) housing 21 and disclosed herein above can be used for the actual measurement scan but a simple pan motor can rotate the housing for changing coverage orientation between well pad 30*a* and well pad 30*b*. In some embodiments of methane measurement system 20, measurements should be made when the sun is positioned generally in front of the system and on an opposite side of the pad to take advantage of the highest amount of light available. In such instances, and with respect to FIG. 11, it may be advantageous to scan pad 30*a* at a different time of day than that of pad 30*b*. For instance scan pad 30*a* in the morning and scan 30*b* in the afternoon.

The resulting methane concentration map (2d or 3d) can be combined with a suitable air quality dispersion model along with wind speed and direction measurements to better pinpoint the leak source(s) and to estimate the total methane emission rate for the site.

One of the features of methane monitoring system 20 is that it is configured to use relatively low amounts of power during operation. One such feature that enable low power consumption is the lack of an active radiation source and the use of solar radiation 14 from the sun 13 (i.e. is a passive source so there is no need for methane monitoring system 20 to power a source). An active source is typically the largest power demand for optical monitoring systems when it is powered by the optical monitoring systems. In addition, methane detection system 20 can incorporate WiFi and Bluetooth communications capability into housing 21 to communicate with communications tower 35 so there is no need for a local read out, although if external power is available the system can include such a local read out. Also included within housing 21 is a web server (not shown) which can also communicate with communications tower 35 so that methane monitoring system 20 can either be added to a local area network or be set up to form its own for peer to peer communication. In addition, a smartphone or laptop with a web browser can join a dedicated password protected network connected to methane monitoring system 20 to configure the unit, see real time results, or access historical data. The device can host a data base to enable any network partner to visualize past data on the web page or download raw data from a desired time frame for further analysis.

In certain embodiments the optoelectronics and processing electronics can be low power design with 2 watts or less power demand. The pan and tilt motors for the methane monitoring device 1 NIR lens field of view scanning can be miniaturized and reside inside housing 21 operating only on the focusing optics assembly 2 for the NIR measurement. The focusing optics assembly 2 can optically couple to a common end of the fiber bundle so that the lens assembly can move freely while the detector electronics are fixed. Moving only the focusing optics assembly 2 reduces the power demand considerably compared to moving the entire housing 21 as is done in the prior art.

In other embodiments methane monitoring system 20 can be configured to scan at a desired frequency. For example, in some instances one or two scans a day may be all that is desired. Compared to the current requirement of a few surveys a year, a daily check of the pad 30 represents a large increase in monitoring frequency. An operator can configure methane monitoring system 20 to perform as many scans as desired. In one configuration a solar panel 36 (FIG. 7) is used to power the unit wherein the solar panel can be a small 10W panel which would be more than sufficient for most applications.

The methane monitoring system 20 can include an idle state position that is focused strategically at a single point on pad 30. In the idle state, methane monitoring system 20 can continue to monitor for methane in 'Idle' mode and initiate a full scan if and when any methane is detected. A variety of control schemes can be available to optimize power consumption while providing continuous leak detection monitoring.

It should be further noted that the optical and optoelectronic components suitable for use in the NIR region are superior in important ways to those that are available for the Mid-IR region. Photo conductive detectors such as InGaAs have significantly better sensitivity, response times, and are considerably lower cost than counterpart detectors for Mid-IR. They have lower dark currents and operate over a broader temperature range from below freezing to over 70° C. which can occur inside enclosures located in desert locals. Additionally, lens and fiber materials suitable for the NIR region are equal or better in performance and much lower cost than those for the Mid-IR region.

All of the methods disclosed and claimed herein can be made and executed without undue experimentation in light of the present disclosure. While the apparatus and methods of this invention have been described in terms of preferred embodiments, it will be apparent to those of skill in the art that variations may be applied to the methods and in the steps or in the sequence of steps of the method described herein without departing from the concept, spirit and scope of the invention. In addition, modifications may be made to the disclosed apparatus and components may be eliminated or substituted for the components described herein where the same or similar results would be achieved. All such similar substitutes and modifications apparent to those skilled in the art are deemed to be within the spirit, scope, and concept of the invention.

Although the invention(s) is/are described herein with reference to specific embodiments, various modifications and changes can be made without departing from the scope of the present invention(s), as presently set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated other The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

While the foregoing is directed to embodiments of the present invention, other and further embodiments of the invention may be devised without departing from the basic scope thereof, and the scope thereof is determined by the claims that follow.

What is claimed is:

1. A gas detection system comprising:
   a gas monitoring device comprising:
   a focusing optics assembly configured to receive a transmitted light from a passive light source;
   a light distribution device configured to receive the transmitted light from the focusing optics assembly and further configured to randomize the transmitted light into a randomized transmitted light and is further configured to simultaneously distribute the randomized transmitted light into a plurality of output channels of substantially equal irradiation energy;
   a plurality of optical filters corresponding to the plurality of output channels wherein each of the plurality of filters is configured to receive the randomized transmitted light and to transmit a sensing light of a preselected wavelength range;
   a plurality of photodetectors corresponding to the plurality of optical filters and configured to receive the sensing light and further configured to output a current proportional to the total irradiance energy of the sensing light; and
   a processor electrically coupled to the plurality of photodetectors and configured to determine a relative attenuation of the sensing light for the plurality of output channels in the presence of a gas.

2. The gas detection system of claim 1 wherein the light distribution device comprises:
   a collection end in optical communication with the focusing optics assembly;
   a fiber bundle comprised of a plurality of optical fibers in optical communication with the collection end; and
   a plurality of sensing legs in optical communication with the plurality of optical fibers; and
   wherein the plurality of output channels are comprised of the plurality of sensing legs.

3. The gas detection system of claim 1 wherein the light distribution device comprises a beam splitter in in optical communication with the focusing optics assembly and configured to split the sensing light into the plurality of output channels.

4. The gas detection system of claim 1 wherein the focusing optics assembly comprises a lens.

5. The gas detection system of claim 1 wherein the plurality of filters are band pass filters configured to transmit the sensing light at wavelengths between 1500 nm and 1750 nm.

6. The gas detection system of claim 1 further comprising a field of view and a path length and wherein the processor is configured to determine the attenuation of the sensing light within the field of view and the path length.

7. The gas detection system of claim 1 wherein the preselected wavelength range is in a near infrared spectrum range.

8. The gas detection system of claim 7 wherein the passive light source includes light in the near infrared spectrum range.

9. The gas detection system of claim 8 wherein the passive light source comprises sunlight.

10. The gas detection system of claim 7 wherein the gas includes an amount of methane gas.

11. The gas detection system of claim 10 wherein the processor is further configured to use the attenuation to determine a concentration of methane gas.

12. The gas detection system of claim 11 further comprising:
a housing configured to contain any of the focusing optics assembly, the light distribution device, the plurality of filters and the plurality of photodetectors;
a first positioning device coupled to the housing configured to selectively move the housing in a panning direction; and
a second positioning device coupled to the housing configured to selectively move the housing in a tilting direction.

13. The gas detection system of claim 12 further comprising the housing coupled to a portable mounting device configured to position the gas detection system at a predetermined location.

14. The gas detection system of claim 12 further configured to be permanently positioned in a predetermined location.

15. The gas detection system of claim 12 further comprising the processor is further configured to control the first positioning device and the second positioning device to selectively move the housing in the panning direction and the tilting direction to scan an area of interest.

16. The gas detection system of claim 15 wherein the area of interest includes any of a well pad, a pipeline, a storage tank, a refinery, an industrial processing facility and an agricultural facility.

17. The gas detection system of claim 15 further comprising a field of view and a path length and wherein the processor is configured to determine the attenuation of the sensing light within the field of view and the path length and wherein the processor is configured to control the first positioning device and the second positioning device in accordance with the field of view to produce a two dimensional grid comprising a plurality of rectangles of the area of interest.

18. The gas detection system of claim 17 further comprising a digital imaging device configured to produce a set of digital images of the area of interest in coordination with the two dimensional grid.

19. The gas detection system of claim 17 wherein the processor is configured to assign the concentration of methane gas to each of the plurality of rectangles.

20. The gas detection system of claim 19 wherein the processor is further configured to produce a two dimensional map of the concentration of methane gas of the area of interest.

21. The gas detection system of claim 20 further comprising a plurality of gas monitoring devices located at a plurality of different positions relative to the area of interest wherein each of the plurality of gas monitoring devices is configured to produce a two dimensional grid of the area of interest and wherein at least one of the processors of the plurality of gas monitoring devices is further configured to use the two dimensional grid from the plurality of gas monitoring devices to produce a three dimensional map of the concentration of methane gas of the area of interest.

22. A method of detecting gas in the atmosphere comprising:
receiving a transmitted light from a passive light source through a focusing optics assembly;
randomizing the transmitted light into a randomized transmitted light;
splitting the randomized transmitted light simultaneously into a plurality of output channels of substantially equal irradiation energy;
filtering each of the plurality of output channels into a sensing light of a preselected wavelength range;
transmitting the sensing light into a plurality of photodetectors corresponding to the plurality of output channels; and
determining a relative attenuation of the sensing light for the plurality of output channels in the presence of a gas.

23. The method of detecting gas in the atmosphere of claim 22 wherein the passive light source includes light in the near infrared spectrum range.

24. The method of detecting gas in the atmosphere of claim 23 wherein the passive light source comprises sunlight.

25. The method of detecting gas in the atmosphere of claim 22 wherein the splitting of the transmitted light is performed by a fiber bundle having a plurality of sensing legs corresponding to the output channels.

26. The method of detecting gas in the atmosphere of claim 22 wherein the splitting of the transmitted light is performed by a beam splitter to split the sensing light into the plurality of output channels.

27. The method of detecting gas in the atmosphere of claim 22 wherein the focusing optics assembly comprises a lens.

28. The method of detecting gas in the atmosphere of claim 22 wherein the filtering comprises transmitting the sensing light at wavelengths between 1500 nm and 1750 nm.

29. The method of detecting gas in the atmosphere of claim 22 wherein the determining the attenuation of the sensing light is performed within a field of view and a path length.

30. The method of detecting gas in the atmosphere of claim 22 further comprising selecting the preselected wavelength range in a near infrared spectrum range.

31. The method of detecting gas in the atmosphere of claim 30 wherein the gas includes an amount of methane gas and the attenuation is caused by the amount of methane gas.

32. The method of detecting gas in the atmosphere of claim 31 further comprising determining a concentration of methane gas.

33. The method of detecting gas in the atmosphere of claim 32 further comprising:
    scanning an area of interest from a first position;
    determining the concentration of methane gas in the area of interest from the first position; and
    producing a first two dimensional grid of the concentration of methane gas in the area of interest from the first position.

34. The method of detecting gas in the atmosphere of claim 33 further comprising producing a first digital image from the first position in coordination with the first two dimensional grid of the concentration of methane gas in the area of interest from the first position.

35. The method of detecting gas in the atmosphere of claim 33 further comprising:
    scanning an area of interest from a second position;
    determining the concentration of methane gas in the area of interest from the second position; and
    producing a second two dimensional grid of the concentration of methane gas in the area of interest from the second position.

36. The method of detecting gas in the atmosphere of claim 35 further comprising producing at least one two dimensional map of the concentration of methane gas of the area of interest using any of the first two dimensional grid of the concentration of methane gas in the area of interest from the first position and the second two dimensional grid of the concentration of methane gas in the area of interest from the second position.

37. The method of detecting gas in the atmosphere of claim 35 further comprising a producing a three dimensional map of the concentration of methane gas of the area of interest using the first two dimensional grid of the concentration of methane gas in the area of interest from the first position and the second two dimensional grid of the concentration of methane gas in the area of interest from the second position.

38. The method of detecting gas in the atmosphere of claim 35 wherein the area of interest includes any of a well pad, a pipeline, a storage tank, a refinery, an industrial processing facility and an agricultural facility.

39. The method of detecting gas in the atmosphere of claim 35 further comprising producing a second digital image from the second position in coordination with the second two dimensional grid of the concentration of methane gas in the area of interest from the second position.

* * * * *